United States Patent
Wu et al.

(10) Patent No.: US 6,645,121 B2
(45) Date of Patent: Nov. 11, 2003

(54) VEHICLE TRANSMISSION SYSTEM FOR CONTROLLING CLUTCH TEMPERATURE

(75) Inventors: Peter E. Wu, Brighton, MI (US); James D. Hendrickson, Bellville, MI (US); Joel H. Gunderson, Westland, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/929,538

(22) Filed: Aug. 13, 2001

(65) Prior Publication Data

US 2003/0036457 A1 Feb. 20, 2003

(51) Int. Cl.[7] .............................................. F16H 59/72
(52) U.S. Cl. ...................................................... 477/98
(58) Field of Search ............................. 475/117; 477/98

(56) References Cited

U.S. PATENT DOCUMENTS

| | | | | |
|---|---|---|---|---|
| 5,421,791 A | * | 6/1995 | Futawatari | 475/117 |
| 5,681,237 A | * | 10/1997 | Furukawa et al. | 477/98 |
| 6,088,631 A | * | 7/2000 | Kuehn et al. | 477/98 |
| 6,095,946 A | * | 8/2000 | Maguire et al. | 477/98 |
| 6,146,309 A | * | 11/2000 | Nishino et al. | 477/98 |

FOREIGN PATENT DOCUMENTS

JP 62-63248 * 3/1987 ............. F16H/5/40

* cited by examiner

Primary Examiner—Sherry Estremsky
(74) Attorney, Agent, or Firm—Christopher DeVries

(57) ABSTRACT

A vehicle transmission system and method of controlling a vehicle transmission are provided that control clutch temperatures to extend clutch life. The system is comprised of an input drive shaft configured to be driven by an engine, an output drive shaft configured to drive a drive mechanism and a plurality of torque-transmitting devices connecting the input drive shaft to the output drive shaft and configured to engage and disengage to provide a transition between a plurality of operating ratios. The system is also comprised of a control module configured to calculate a temperature of the plurality of transmitting devices based at least in part upon a shifting status of the plurality of transmitting devices. The control module is further configured to conduct at least a first modification if the temperature is greater than a first predetermined temperature and a second modification if the temperature is greater than a second predetermined temperature.

17 Claims, 6 Drawing Sheets

VEHICLE TRANSMISSION SYSTEM FOR CONTROLLING CLUTCH TEMPERATURE

TECHNICAL FIELD

The present invention generally relates to a vehicle transmission system, and more particularly to a vehicle transmission system and method of operating a vehicle transmission system for controlling the temperature of torque transmitting devices.

BACKGROUND OF THE INVENTION

A vehicle transmission generally includes a number of gear elements coupling an input drive shaft and an output drive shaft, and a related number of torque-transmitting devices, which shall also be referred to as clutches, that are formed of one or more components such as bands, plates, rings, seals, fluids, springs, retainer and ball assemblies and/or brakes, which are selectively engaged and disengaged to select particular gear elements and establish an operating ratio between the input drive shaft and the output drive shaft of the vehicle. The torque-transmitting devices can be of any number of configurations, including band and disc brakes, which are generally known in the art as reaction clutches, brake clutches or application clutches.

The input drive shaft is coupled to the engine of the vehicle, and the output drive shaft is directly coupled to the wheels, propeller or other drive mechanism of the vehicle. Transition or shifting from a first operating ratio, such as a first velocity ratio, to a second operating ratio, such as a second velocity ratio, is performed in response to any number of parameters such as engine load or throttle position, vehicle velocity and/or operator commands. The transition or shift generally involves releasing and disengaging one or more clutches (i.e., off-going) associated with the first operating ratio and applying or engaging one or more clutches (i.e., on-coming) associated with the second operating ratio. This engaging and disengaging action typically increases the temperature of the clutch, and the period that a clutch can be utilized before replacement (i.e., clutch life or clutch durability) is at least partially related to this temperature. For example, a clutch operating at 450° F. has an almost unlimited clutch life while a clutch operating at 550° F. has a clutch life that has orders of magnitude fewer off-going and on-coming cycles during a clutch life, and a clutch operating at 700° F. has yet orders of magnitude fewer off-going and on-coming cycles during a clutch life.

Numerous techniques have been introduced to control the temperature of the clutch and increase the clutch life. For example, hot mode techniques have been introduced to cool the fluid of a transmission. However, additional apparatus and methods for controlling the temperature of the clutch to increase clutch life are continually sought to supplement, enhance and/or replace existing techniques. In addition, methods and apparatus are desired to address excessive and repeated shifts of the transmission by the operator of the vehicle and/or excessive and repeated shifts of the transmission by the control system of the vehicle.

In view of the foregoing, it should be appreciated that it would be desirable to provide a vehicle transmission system and methods of operating a vehicle transmission system that control the clutch temperatures of the transmission system to extend the clutch life. In addition, it should be appreciated that it would be desirable to provide a system and methods that address excessive and repeated shifts of the transmission, which substantially increase clutch temperature and decrease clutch life. Furthermore, additional desirable features will become apparent to one skilled in the art from the foregoing background of the invention and following detailed description of a preferred exemplary embodiment and appended claims.

SUMMARY OF THE INVENTION

In accordance with the teachings of the present invention, a vehicle transmission system and method of operating a vehicle transmission system are provided that control clutch temperatures to extend the clutch life. The vehicle transmission is comprised of an input drive shaft configured to be driven by an engine of the vehicle, an output drive shaft configured to drive a drive mechanism of the vehicle and a plurality of torque-transmitting devices connecting the input drive shaft to the output drive shaft and configured to engage and disengage to provide a transition between a plurality of operating ratios of the input drive shaft and the output drive shaft. The vehicle transmission system is also comprised of a control module configured to predict a temperature of the plurality of torque-transmitting devices based at least in part upon a shifting status of the plurality of torque-transmitting devices. The control module is further configured to conduct at least a first modification of the operation of the plurality of torque-transmitting devices if the temperature is greater than a first predetermined temperature and a second modification of the operation of the plurality of torque-transmitting devices if the temperature is greater than a second predetermined temperature.

BRIEF DESCRIPTION OF THE DRAWINGS

The present invention will hereinafter be described in conjunction with the appended drawing figures, wherein like numerals denote like elements, and.

DESCRIPTION OF THE PREFERRED EMBODIMENT

The following detailed description of a preferred exemplary embodiment of the invention is mainly exemplary in nature and is not intended to limit the invention or the application or use of the invention.

Figure 1:
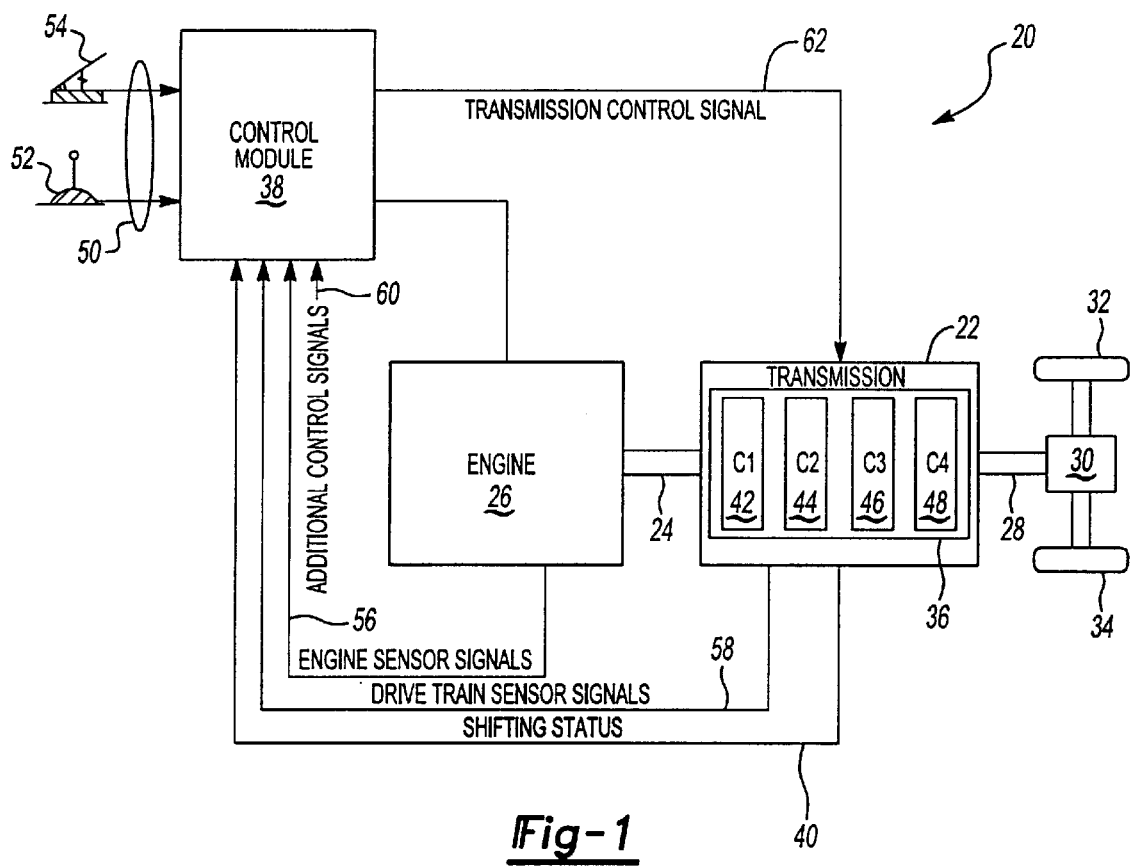
FIG. 1 is a simplified schematic of a vehicle transmission system that provides temperature control of torque-transmitting devices according to a preferred exemplary embodiment of the present invention.

FIG. 1 is a simplified schematic of a vehicle transmission system 20 according to a preferred exemplary embodiment of the present invention. The vehicle transmission system 20 is comprised of an input drive shaft 24 driven by an engine 26, an output drive shaft 28 connected to a drive mechanism 30 (e.g., wheels 32, 34), and a plurality of torque-transmitting devices 36 connecting the input drive shaft 24 and the output drive shaft 28, which are configured to engage and disengage to provide a transition between a plurality of operating ratios of the input drive shaft 24 and the output drive shaft 28. The vehicle transmission system 20 is further comprised of a control module 38 that is configured to calculate a temperature of at least one of the plurality of torque-transmitting devices 36 based at least in part upon a shifting status 40 of the plurality of torque-transmitting devices 36. The control module 38 is further configured to conduct at least a first modification of the operation of the plurality of torque-transmitting devices 36 if the temperature is greater than a first predetermined temperature and/or a second modification of the operation of the plurality of torque-transmitting devices 36 if the temperature is greater than a second predetermined temperature.

While the foregoing background of the invention and following description of a preferred exemplary embodiment are directed to vehicle transmission system 20 of an automobile, the present invention is applicable to any number of land, water, air or space vehicles. In addition, while the plurality of operating ratios between the input drive shaft 24 and the output drive shaft 28 preferably provide a plurality of velocity and torque ratios between the engine 26 and the drive mechanism 30, any number of operating ratios between the input drive shaft 24 and the output drive shaft 28 can be provided in accordance with the present invention. Furthermore, while two predetermined temperatures and two corresponding modifications of the operation of the plurality of torque-transmitting devices 36 are described in this detailed description of a preferred exemplary embodiment, any number of predetermined temperatures and modifications can be employed in accordance with the present invention (e.g., a third predetermined temperature and a third modification of the operation of the plurality of torque-transmitting devices 36). In addition, while the temperature calculation for one of the plurality of torque-transmitting devices 36 subsequently described in this detailed description of a preferred exemplary embodiment is a calculation of the current temperature of the device, a potential temperature change can also be calculated for an eminent shift under current operating conditions that would be added with the current temperature of the device before the comparison to one or more of the predetermined temperatures.

Each of the plurality of torque-transmitting devices 36, which will also be referred herein as clutches, can be any number of configurations, including band or disc configurations. Furthermore, while the plurality of torque-transmitting devices 36 in this detailed description of a preferred exemplary embodiment consists of a first clutch 42, second clutch 44, third clutch 46 and fourth clutch 48, the plurality of torque-transmitting devices 36 can consist of any number of clutches and/or brakes. In addition, while each of the clutches (42,44,46,48) will operate to perform a transition or shift between operating ratios, each of the individual clutches (42,44,46,48) can be formed of one or more components such as bands, plates, rings, seals, fluid, springs, retainer and ball assemblies and/or brakes, that operate individually or in conjunction with one or more clutches to perform a transition or shift between operating ratios.

The first clutch 42, second clutch 44, third clutch 48 and/or fourth clutch 48 are selectively engaged and disengaged to establish an operating ratio. This selective engagement and disengagement of the clutches (42,44,46,48) can be mechanically performed with any number of apparatuses and methods. For example, the apparatus described in U.S. Pat. No. 4,070,927, titled "Plenary Gearing Arrangement for a Transmission," issued to James C. Polak on Jan. 31, 1978 and assigned to the assignee of the present invention, can be used in accordance with the present invention, and this document is hereby incorporated by reference.

The selective engagement and disengagement of the clutches (42,44,46,48) is at least partially controlled by the control module 38 in response to input signals 50 from an operator of the vehicle (e.g., an operator gear shift selector 52 and/or an operator accelerator pedal 54), engine sensor signals 56 from the engine 26, drive train sensor signals 58 from the transmission 22 and/or drive mechanism 30, and/or additional control signals 60 of the vehicle. The control module 38 is preferably configured to generate a transmission control signal 62 that effectuates the appropriate engagement and disengagement of the clutches (42,44,46, 48) for a particular operating ratio. In addition, the control module 38 is preferably configured to alter the transmission control signal 62 if a temperature of one of the clutches (42,44,46,48) is calculated by the control module 38 to be greater than a first predetermined temperature and/or a second predetermined temperature such that the temperature of the torque transmitting devices 22 is controlled to improve clutch life.

Figure 2A:
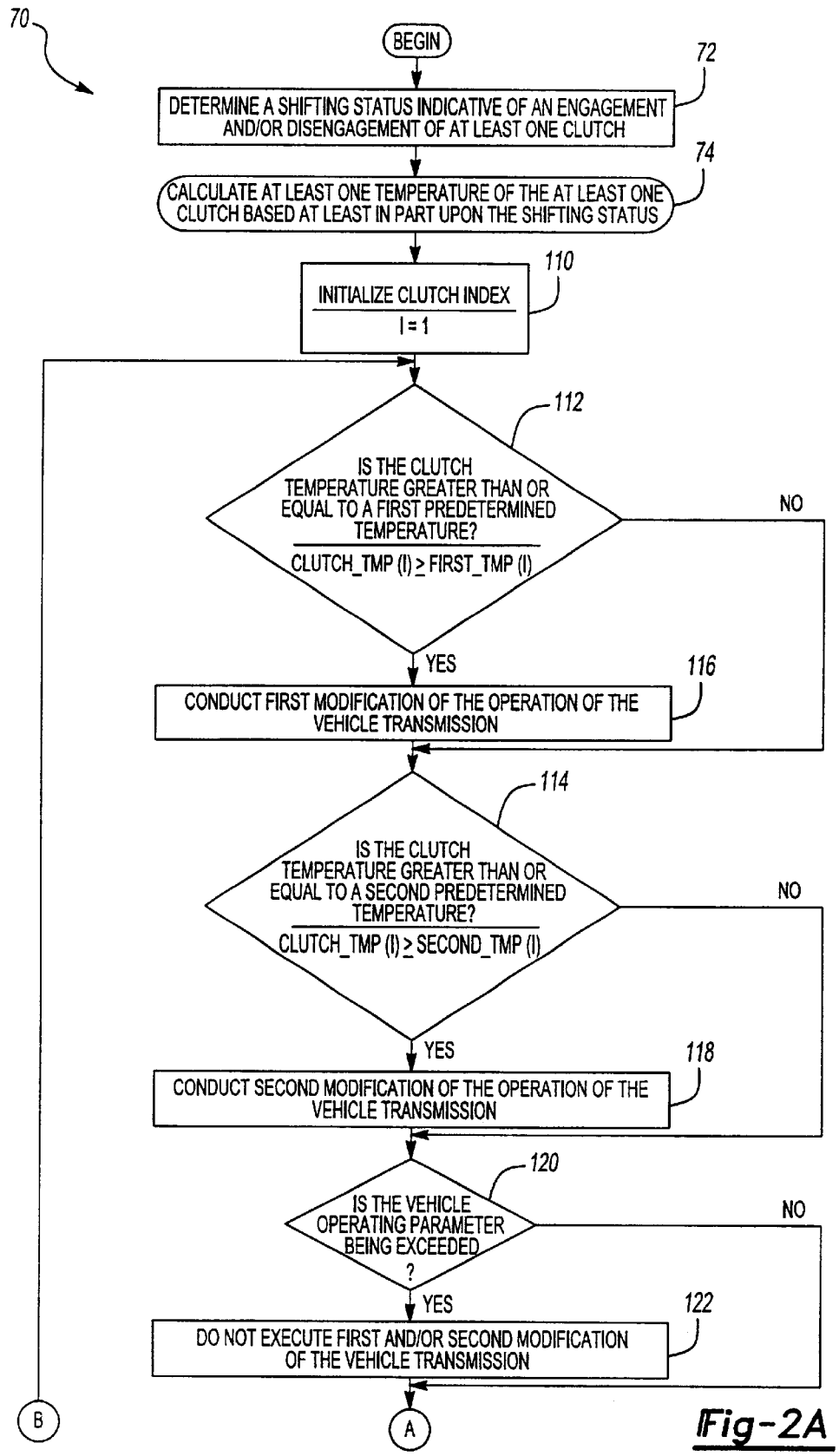
FIGS. 2A and 2B are a flow chart illustrating a method of operating a vehicle transmission system that controls the clutch temperatures of a vehicle transmission system according to a preferred exemplary embodiment of the present invention.
Figure 2B:
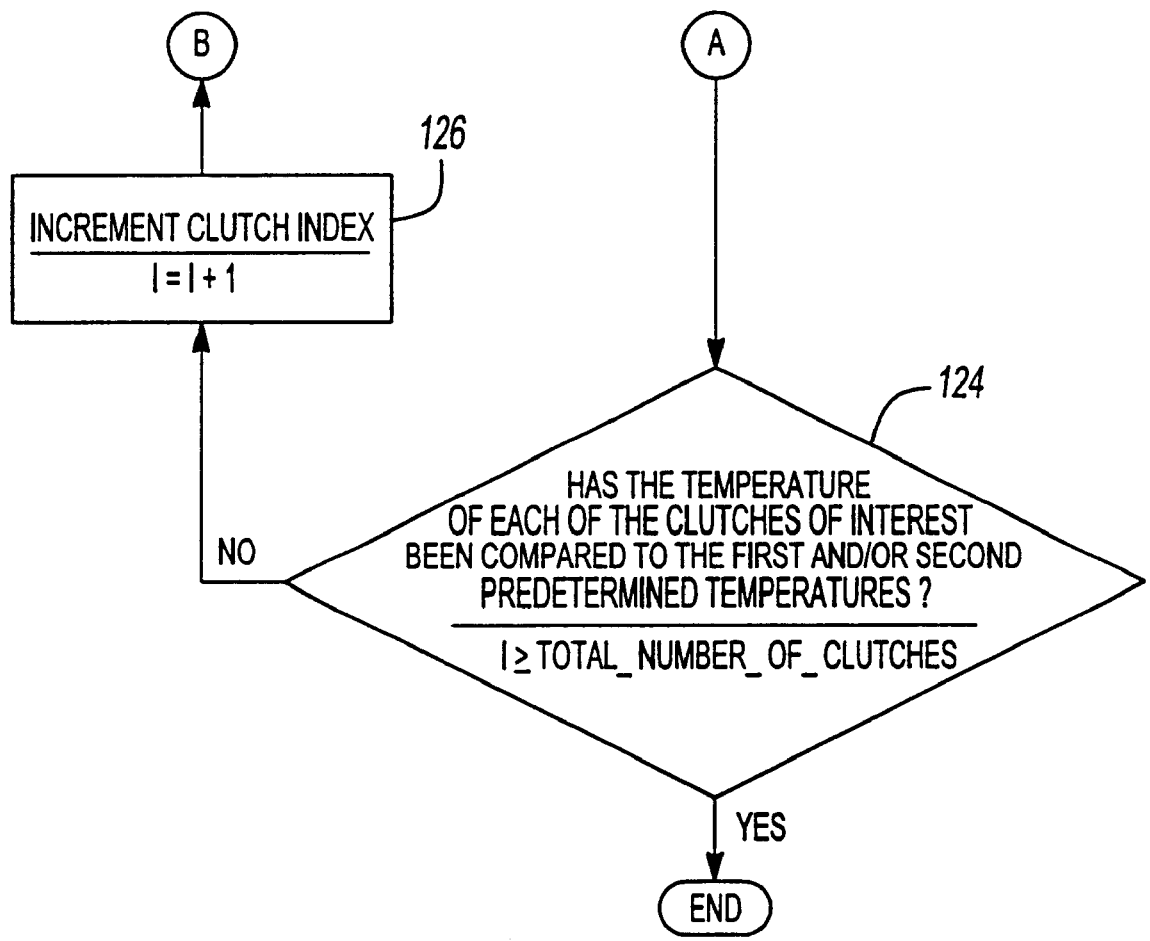

Referring to FIGS. 2A and 2B, a method 70 of operating the vehicle transmission system 20 of FIG. 1 is illustrated according to a preferred exemplary embodiment of the present invention. Initially, the method 70 determines a shifting status that is indicative of the engagement and disengagement of at least one of the plurality of torque-transmitting devices or clutches 36, preferably more than one of the plurality of clutches, more preferably a majority of the clutches and most preferably substantially all or all of the clutches. The shifting status preferably indicates whether an up-shift or down-shift is occurring with one or more of the clutches and also provides additional information of the shift as will be subsequently described in this detailed description of a preferred exemplary embodiment. Once the shifting status is determined 72, a temperature of at least one and more preferably more than one of the clutches is calculated based at least in part upon the shifting status 74.

Figure 3:
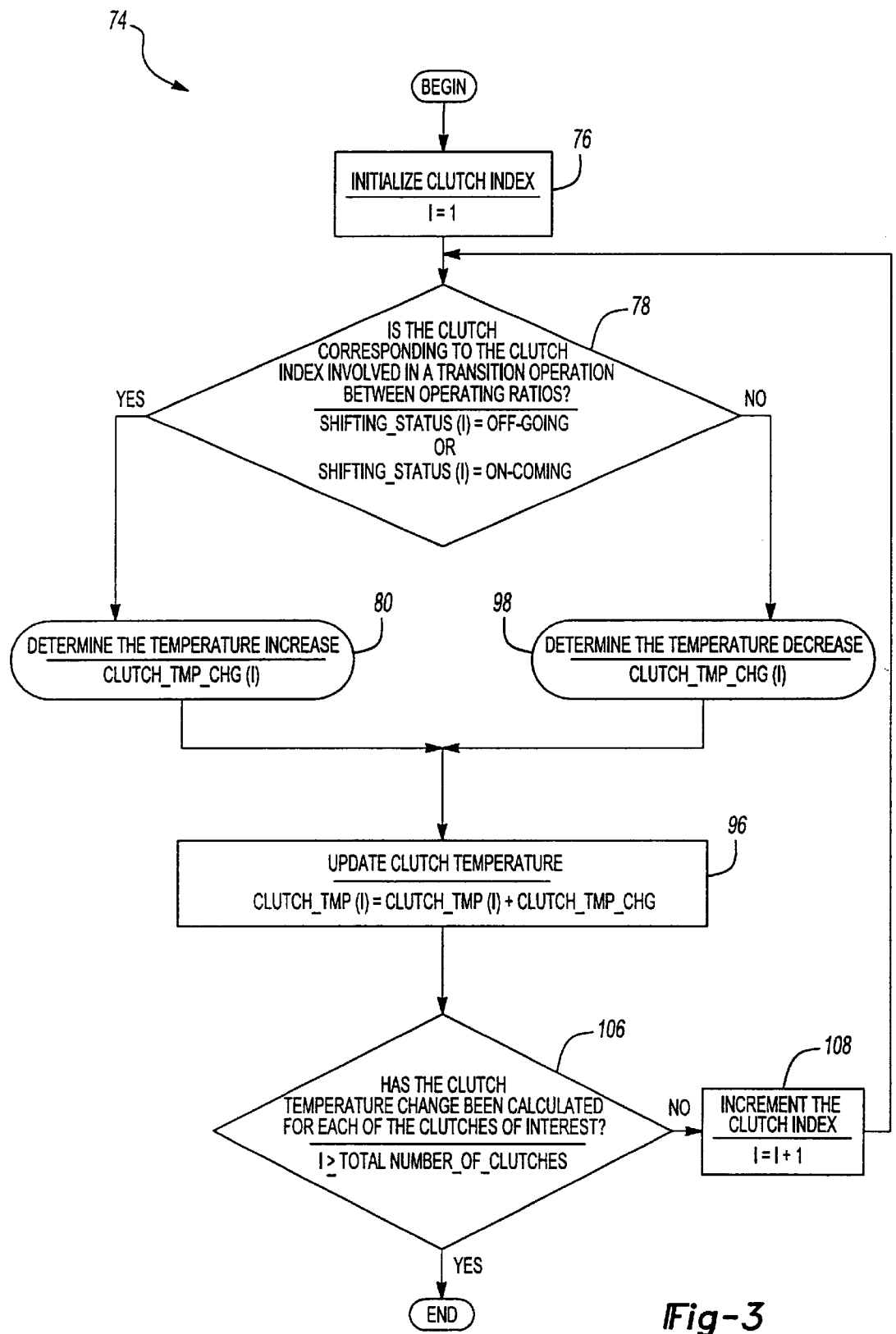
FIG. 3 is a flow chart illustrating the method of calculating the temperature of a clutch of FIGS. 2A and 2B according to a preferred exemplary embodiment of the present invention.

Referring to FIG. 3, the method 74 of calculating the temperature of at least one clutch begins with an initialization of the clutch index (I) 76. The clutch index (I) preferably identifies each of the clutches for which a temperature is calculated by the method 74 of FIG. 3. Once the clutch index (I) 76 is initialized, the shifting status is evaluated to determine if the clutch corresponding to the clutch index (I) is involved in a transition operation between one or more operating ratios 78. For example, the shifting status is evaluated to determine whether the clutch is involved in a releasing and disengaging action (i.e., off-going action) or an engaging action (i.e., on-coming action). If the shifting status provides that the clutch is involved in an off-going or on-coming action, a temperature increase is calculated for the clutch 80.

Figure 4:
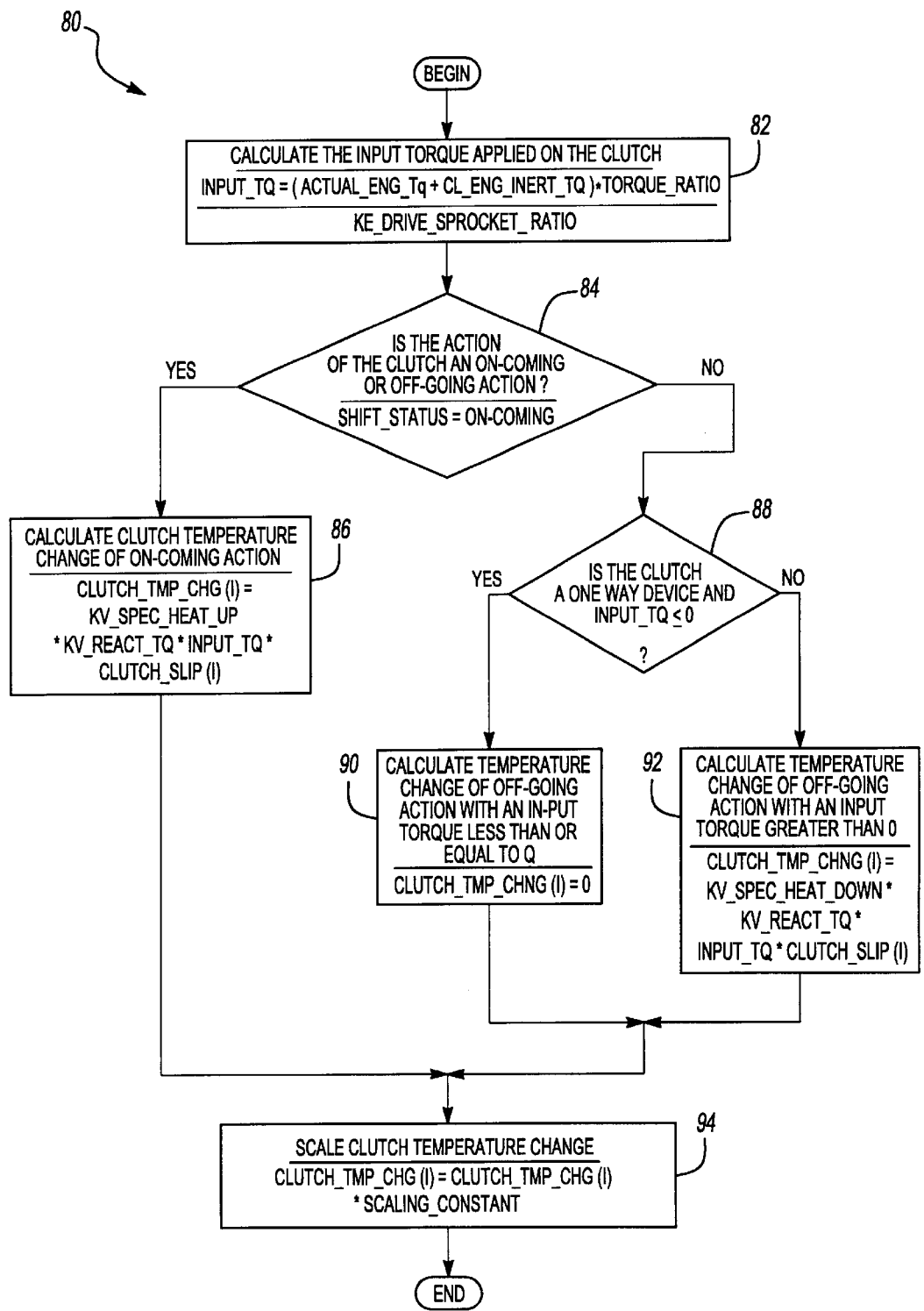
FIG. 4 is a flowchart illustrating the method of determining a temperature increase of FIG. 3 according to a preferred exemplary embodiment of the present invention.

Referring to FIG. 4, which illustrates the method 80 of calculating a temperature increase for the clutch, the method 80 begins with a calculation of the input torque (Input_Tq) applied on the clutch 82. While the input torque can be calculated with any number of techniques, the input torque is calculated as follows in accordance with the present invention:

$$Input\_Tq = \frac{(Actual\_Eng\_Tq + Cl\_Eng\_Inert\_TQ) * Torque\_Ratio}{Ke\_Drive\_Sprocket\_Radio} \quad (1)$$

where Actual_Eng_Tq is the actual engine torque that can be measured and/or calculated with any number of engine and/or transmission parameters, such as Rotations Per Minute (RPM) of the engine, throttle opening, amount of air flowing into the cylinders, amount of fuel injection, timing of the spark ignition and friction of parasitic losses, using techniques known to one of ordinary skill in the art; Cl_Eng_Inert_TQ is the engine inertia torque that can be measured and/or calculated with any number of engine and/or transmission parameters, such as the acceleration or deceleration of the engine speed multiplied by the moment of inertia of the spinning engine and torque converter pump, using techniques known to one of ordinary skill in the art; Ke_Drive_Sprocket_Ratio is a predetermined constant relating engine speed to the rotation speed of the input member of the gear box; and Torque_Ratio is the torque ratio that can be measured and/or calculated with any number of engine and/or transmission parameters, such as a predetermined multiplication value for a converter operating at a given speed ratio, using techniques known to one of ordinary skill in the art.

Once the input torque is calculated 82, the method 80 evaluates the shifting status to distinguish between the transition action of the clutch as an on-coming action or an off-going action 84. If the shifting status indicates that the clutch is involved in an on-coming action, the temperature change of the clutch [i.e., Clutch_Tmp_Chg(I)] is calculated for an on-coming action 86, otherwise the type of clutch and input torque is evaluated 88 and the temperature increase of the clutch is calculated for a one-way clutch device and off-going action for a one-way clutch device with an input torque that is less than or equal to zero 90 or an input torque that is greater than zero 92.

More specifically, the temperature increase of the clutch in an on-going action is preferably calculated as follows, even though any number of temperature calculation techniques for an on-going action can be utilized in accordance with the present invention:

$$Clutch\_Tmp\_Chg(I)=Kv\_Spec\_Heat\_Up*KV\_React\_Tq*Input\_Tq*Clutch\_Slip(I) \quad (2)$$

where KV_Spec_Heat_Up is a predetermined constant for a particular clutch and provides the amount of energy in Joules to increase the temperature of the clutch by one degree for an upshift; KV_React_Tq is a predetermined constant for a particular clutch and provides the amount of torque applied to the clutch in relation to the torque applied to the gear box; Input_Tq is the input torque previously calculated according to equation (1) and Clutch_Slip (I) is the speed difference between two rotating members of the clutch pack and is calculated as follows:

$$Clutch\_Slipt(I)=(K5*Input\_Speed)-(K6*Output\_Speed) \quad (3)$$

where K5 and K6 are predetermined constants relating the slip across the rotating surfaces of a clutch, Input_Speed is the speed of the input drive shaft; and Output_Speed is the speed of the output drive shaft.

The temperature increase of the clutch is calculated for an off-going action with an input torque that is greater than zero 92 using equation (2) except that a specific heat down (i.e., KV_Spec_Heat_Down) is substituted for a specific heat increase (i.e., KV_Spec_Heat_Up) as follows:

$$Clutch\_Tmp\_Chg(I)=Kv\_Spec\_Heat\_Down*KV\_React\_Tq*Input\_Tq*Clutch\_Slip(I) \quad (4)$$

where KV_Spec_Heat_Down is a predetermined constant for a particular clutch and provides the amount of energy in Joules to increase the temperature of the clutch by one degree for a downshift. In addition, the temperature increase of the clutch is calculated for an off-going action with a one-way clutch device and an input less than or equal to zero 90 using equation (4), except that the value of the input torque is set to zero (Input_Tq=0).

Once the temperature increase is calculated for an on-coming action 86 or an off-going action with an input torque that is less than or equal to zero for an off-going action and an input toque that is greater than zero 92, the method 80 of determining the temperature increase of a clutch is complete and the method 80 returns to the method 74 of FIG. 3 to update the clutch temperature [i.e., Clutch_Tmp(I)] with the calculated temperature increase 96 [i.e., Clutch_Tmp_Chg(I)]. Alternatively, the clutch temperature is updated with a calculated temperature decrease corresponding to no clutch involvement in a transition or shift operation between operating ratios of the transmission 98.

Figure 5:
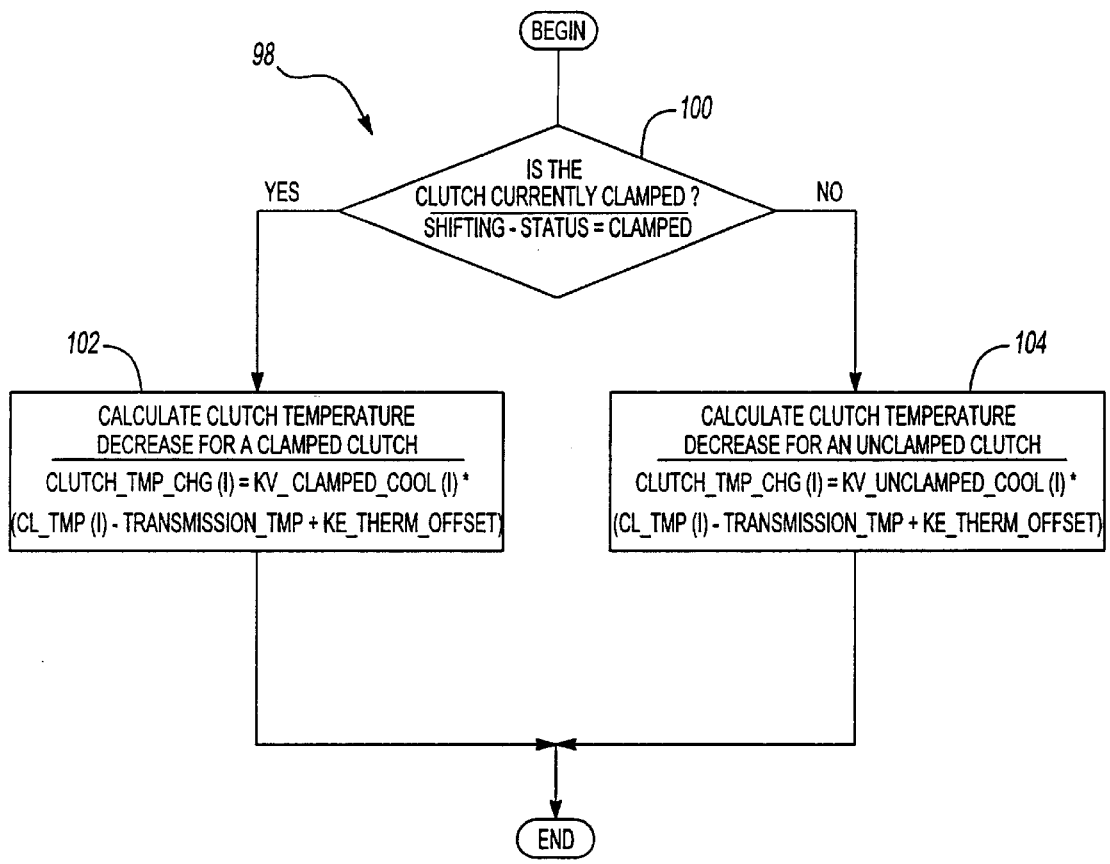
FIG. 5 is a flowchart illustrating the method of determining a temperature decrease of FIG. 3 according to a preferred exemplary embodiment of the present invention.

Referring to FIG. 5, the method 98 of determining the temperature decrease of FIG. 3 is illustrated according to a preferred exemplary embodiment of the present invention. Initially, the method 98 determines whether the clutch is currently clamped 100 (e.g., clutch packs are compressed together and the slip between the members is substantially zero). If the clutch is currently clamped, the clutch temperature decrease is calculated for a clamped clutch 102, and if the clutch is currently unclamped, the clutch temperature decrease is calculated for an unclamped clutch 104.

More specifically, the clutch temperature decrease for a clamped clutch 102 is calculated as follows:

$$Clutch\_Tmp\_Chg(I)=KV\_Clamped\_Cool*(Cl\_Tmp(I)-Trans\_Tmp+KE\_Therm\_Offset) \quad (5)$$

where KV_Clamped_Cool is a predetermined constant for the cooling rate of a particular clamped clutch; Cl_Tmp(I) is the current temperature of the clutch; Trans_Tmp is the temperature of the transmission sump reservoir, which can be calculated and/or measured using any number of techniques that are know to one of ordinary skill in the art; and KE_Therm_Offset is an offset from a temperature at which a clutch will eventually tend to approach and/or reach given minimal or no shifting activity of the clutch. The clutch temperature decrease is calculated for an unclamped clutch as follows:

$$Clutch\_Tmp\_Chg(I)=KV\_Unclamped\_Cool*(Cl\_Tmp(I)-Trans\_Tmp+KE\_Therm\_Offset) \quad (6)$$

where KV_Unclamped_Cool is a predetermined constant for the cooling rate of a particular unclamped clutch. Once the temperature decrease is calculated (102,104), the method 98 returns to the method 74 of FIG. 3 to update the clutch temperature [i.e., Clutch_Tmp(I)] with the calculated temperature decrease 98. Referring to FIG. 3, after the clutch temperature is updated with the temperature decrease or the temperature increase 96, a query is made to determine if the clutch temperature change has been determined for each of the clutches of interest 106.

As previously provided in this detailed description of a preferred exemplary embodiment, the temperature of at least one clutch is calculated based at least in part upon the shifting status. However, the temperature of more than one clutch is preferably calculated based at least in part upon the shifting status. Therefore, the clutch index (I) is compared to the number of clutches for which the temperature is preferably calculated 106 in accordance with a preferred exemplary embodiment of the present. If more clutches are to be evaluated as indicated by the clutch index having a value that is less than or equal to the number of clutches for which a temperature is to be calculated, the clutch index (I) is incremented 108 and the method 74 of FIG. 3 repeats, beginning with the determination as to whether the clutch corresponding to the index is involved in a transition or shifting operation between operating ratios 78. Otherwise, the calculation of at least one temperature of the at least one clutch is complete, and the method 74 of FIG. 3 is complete.

Referring to FIGS. 2A and 2B, after the calculation of at least one temperature of at least one clutch has been completed 74, the clutch index (I) is initialized 110 and the temperature of the clutch associated with the clutch index is preferably compared to a first predetermined temperature for the clutch corresponding to the current clutch index (i.e., I) 112 and/or a second predetermined temperature 114 for the clutch corresponding to the current clutch index (i.e., I) and a first modification of the operation of the clutch is conducted if the temperature is at least about equal (i.e., greater than or equal to) to the first predetermined temperature corresponding to the current clutch index (i.e., I) 116 and/or a second modification of the operation of the clutch is conducted if the temperature is at least equal (i.e., greater than or equal to) to the second predetermined temperature corresponding to the current clutch index (i.e., I) 118.

More specifically, according to a preferred exemplary embodiment of the present invention, the first modification of the operation of the transmission preferably involves reducing shift energy. For example, during a shifting event, increasing torque reduction and/or reducing the transition period between operating ratios can reduce the shift energy. In addition, the non-shifting pressure can be increased to increase lube flow or the shift schedule can be slightly altered to reduce the frequency of the clutch involvement in a transition during non-shifting periods if the temperature is at least equal to the first predetermined temperature 118. If the temperature is at least equal to the second predetermined temperature, the second modification of the operation of the transmission preferably involves inhibiting a transition between operating ratios with the clutch. This can be accomplished with any number of techniques that are known to one of ordinary skill in the art.

Once the method 70 determines whether a first modification and/or second modification of the operation of the clutch is desirable to decrease clutch temperature, additional vehicle operating parameters are evaluated in order to determine whether the modification is appropriate for execution 120. For example, the engine operating parameters are evaluated and if the engine is operating at a level that exceeds specified operating specifications, the first modification and/or second modification are not executed 122 and the method 70 determines if additional clutch temperatures are to be compared to the first and/or second temperatures for potential modification of the operation of the clutch 124. If additional clutch temperatures are to be compared by the method 74, the clutch index is incremented 126 and the method 70 repeats the comparisons of the first predetermined temperature and/or second predetermined temperature and the clutch temperature (112,114), the first and/or second modifications of the operation of the clutch (116,118) and comparison to an operating parameter 120 until each of the clutch temperatures of interest have been evaluated by the method 74.

As can be appreciated by the foregoing detailed description of a preferred exemplary embodiment, the present invention provides a vehicle transmission system and methods of operating a vehicle transmission system that control the clutch temperatures of the vehicle transmission system to extend the clutch life. In addition, it should be appreciated that a system and method are provided that address excessive and repeated shifts of the transmission, which substantially increase clutch temperature and decrease clutch life. Furthermore, the invention provides additional desirable features that will become apparent to one skilled in the art from the foregoing background of the invention and foregoing detailed description of a preferred exemplary embodiment and appended claims. Lastly, the foregoing detailed description provides a preferred exemplary embodiment only, and is not intended to limit the scope, applicability, or configuration of the invention in any way. Rather, the ensuing detailed description will provide those skilled in the art with a convenient road map for implementing a preferred embodiment of the invention, it being understood that various changes may be made in the function and arrangement of elements described in an exemplary preferred embodiment without departing from the spirit and scope of the invention as set forth in the appended claims.

What is claimed:

1. A vehicle transmission system, comprising:

an input chive shaft configured to be driven by an engine;

an output drive shaft configured to drive a drive mechanism;

a plurality of torque-transmitting devices connecting said input drive shaft to said output drive shaft and configured to engage and disengage to provide a transition between a plurality of operating ratios of said input drive shaft and said output drive shaft;

a control module configured to calculate a temperature of said plurality of torque-transmitting devices based at least in part upon a shifting status of said plurality of torque-transmitting devices, said control module further configured to conduct at least a first modification of the operation of said plurality of torque-transmitting devices if said temperature is at least equal to a first predetermined temperature and a second modification of the operation of said plurality of torque-transmitting devices if said temperature is at least about equal to a second predetermined temperature; and wherein said control module is configured to cease said second modification of the operation of said plurality of torque-transmitting devices if said temperature is less than said second predetermined temperature.

2. The vehicle transmission system of claim 1, wherein said control module is further configured to conduct a third modification of the operation of the plurality of torque-transmitting devices if said temperature is at least equal to a third predetermined temperature.

3. The vehicle transmission system of claim 1, wherein said control module is configured to cease said first modification of the operation of said plurality of torque-transmitting devices if said temperature is less than said first predetermined temperature.

4. The vehicle transmission system of claim 1, wherein said control module is configured to cease said first modification of the operation of said plurality of torque-transmitting devices if an engine parameter is at least equal to a predetermine engine value.

5. The vehicle transmission system of claim 1, wherein said control module is configured to calculate a temperature increase for one of said plurality of torque transmitting devices if said one of said plurality of torque-transmitting devices is involved in said transition between said plurality of operating ratios.

6. The vehicle transmission system of claim 1, wherein said first modification of the operation of said plurality of torque-transmitting devices is not involved in said transition between said plurality of operating ratios.

7. The vehicle transmission system of claim 1, wherein said second modification of the operation of said plurality of torque-transmitting devices includes inhibiting said transition between operating ratios.

8. A method for controlling a vehicle transmission system, comprising:

generating a shifting status that is indicative of an engagement and disengagement of a plurality of torque-transmitting devices;

receiving said shifting status that is indicative of said engagement and disengagement of said plurality of torque-transmitting devices;

calculating a temperature of said plurality of transmitting devices based at least in part upon said shifting status;

conducting a first modification of the operation of said plurality of torque-transmitting devices if said temperature is at least substantially equal to a first predetermined temperature; and conducting a second modification of the operation of said plurality of torque-transmitting devices if said temperature is at least equal to a second predetermined temperature; and ceasing said second modification of the operation of said plurality of torque-transmitting devices if an engine parameter is less than a second predetermined temperature.

9. The method of claim 8, further comprising conducting a third modification of the operation of the plurality of torque-transmitting devices if said temperature is at least equal to a third predetermined temperature.

10. The method of claim 8, further comprising ceasing said first modification of the operation of said plurality of torque-transmitting devices if said temperature is less than said first predetermined temperature.

11. The method of claim 8, further comprising ceasing said first modification of the operation of said plurality of torque-transmitting devices if an engine parameter is at least equal to a predetermine engine value.

12. The method of claim 8, wherein calculating a temperature of said plurality of transmitting devices based at least upon said shifting status comprises calculating a temperature increase for one of said plurality of torque-transmitting devices if said one of said plurality of torque-transmitting devices is involved in a transition between a plurality of operating ratios.

13. The method of claim 8, wherein calculating a temperature of said plurality of transmitting devices based at least in part upon said shifting status comprises calculating a temperature decrease for one of said plurality of torque-transmitting devices if said one of said plurality of torque-transmitting devices is not involved in a transition between a plurality of operating ratios.

14. The method of claim 8, wherein said first modification of the operation of said plurality of torque-transmitting devices includes reducing shift energy.

15. The method of claim 9, wherein said second modification of the operation of said plurality of torque-transmitting devices includes inhibiting a transition between a plurality of operation ratios provided at least in part by said engagement and disengagement of said plurality of torque-transmitting devices.

16. A vehicle transmission system, comprising:

an input drive shaft configured to be driven by an engine;

an output drive shaft configured to drive a drive mechanism;

a plurality of torque-transmitting devices connecting said input drive shaft to said output drive shaft and configured to engage and disengage to provide a transition between a plurality of operating ratios of said input drive shaft and said output drive shaft; and a control module configured to calculate a temperature of said plurality of torque-transmitting devices based at least in part upon a downshift or upshift of said plurality of torque-transmitting devices, said control module further configured to conduct at least a first modification of the operation of said plurality of torque-transmitting devices if said temperature is at least equal to first predetermined temperature and a second modification of the operation of said plurality of torque-transmitting devices if said temperature is at least equal to a second predetermined temperature.

17. A method for controlling a vehicle transmission system, comprising:

generating a shifting status that is indicative of an engagement and disengagement of a plurality of torque-transmitting devices;

receiving said shifting status that is indicative of said engagement and disengagement of said plurality of torque-transmitting devices;

calculating a temperature of said plurality of transmitting devices based at least in part upon said shifting status including downshifting and upshifting;

conducting a first modification of the operation of said plurality of torque-transmitting devices if said temperature is at least equal to a first predetermined temperature; and conducting a second modification of the operation of said plurality of torque-transmitting devices if said temperature is at least equal to a second predetermined temperature.

* * * * *